United States Patent
Jones et al.

(10) Patent No.: US 6,595,221 B2
(45) Date of Patent: Jul. 22, 2003

(54) AUTOMATIC SPRAY ARCH IMPACT RESET MECHANISM

(75) Inventors: Allen S. Jones, Bay Islands (NZ); Doug Diemel, Shiocton, WI (US); Jim Ward, Green Bay, WI (US); Dan Janke, Milwaukee, WI (US); Kenneth J. Dollhopf, Green Bay, WI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 176 days.

(21) Appl. No.: 09/848,919

(22) Filed: May 4, 2001

(65) Prior Publication Data

US 2002/0002987 A1 Jan. 10, 2002

Related U.S. Application Data

(60) Provisional application No. 60/203,238, filed on May 8, 2000.

(51) Int. Cl.⁷ .................................................. B08B 3/02
(52) U.S. Cl. ....................... 134/57 R; 134/123; 134/181
(58) Field of Search ........................... 134/56 R, 58 R, 134/57 R, 45, 123, 181; 15/DIG. 2

(56) References Cited

U.S. PATENT DOCUMENTS

| | | | |
|---|---|---|---|
| 4,754,515 A | 7/1877 | Ennis et al. ............. 15/53 |
| 3,299,901 A * | 1/1967 | Axe et al. |
| 3,335,422 A * | 8/1967 | Alimanestiano |
| 3,559,659 A * | 2/1971 | Gougoulas |
| 3,570,502 A * | 3/1971 | Farnsworth et al. |
| 3,575,184 A * | 4/1971 | Jurkens |
| 3,818,531 A | 6/1974 | Saunders ............... 15/21 D |
| 3,897,263 A * | 7/1975 | Davis et al. |
| 3,939,517 A * | 2/1976 | Bivens |
| 4,513,467 A | 4/1985 | Roncaglione ............ 15/53 |
| 4,562,848 A * | 1/1986 | Messing et al. |
| 4,716,916 A * | 1/1988 | Hodge |
| 4,718,439 A * | 1/1988 | Gorra et al. |
| 4,719,932 A * | 1/1988 | Burton |
| 4,798,217 A * | 1/1989 | Hanna |
| 4,856,543 A * | 8/1989 | Petit |
| 4,865,058 A * | 9/1989 | Crotts et al. |
| 5,093,951 A | 3/1992 | Smith et al. ............. 15/53.2 |
| 5,226,436 A | 7/1993 | Kirby ....................... 134/57 |
| 5,511,272 A | 4/1996 | Belanger et al. ......... 15/53.3 |
| 5,709,002 A | 1/1998 | Belanger et al. ......... 15/97.3 |
| 5,715,558 A | 2/1998 | Johnson ................... 15/53.3 |
| 5,722,104 A | 3/1998 | Wentworth ............. 15/53.2 |
| 5,813,077 A | 9/1998 | Belanger et al. ......... 15/97.3 |
| 6,372,053 B1 * | 4/2002 | Belanger et al. |
| 6,508,260 B2 * | 1/2003 | Anderson |

FOREIGN PATENT DOCUMENTS

EP      0 302 964      10/1987

OTHER PUBLICATIONS

Japan Patent Abstract 10 059140, Mar. 03, 1998. (1 page).

* cited by examiner

Primary Examiner—Frankie L. Stinson
(74) Attorney, Agent, or Firm—Andrus, Sceales, Starke & Sawall

(57) ABSTRACT

An impact reset mechanism and method that automatically resets a spray arch in a vehicle washing system to permit operation of the vehicle wash system after the spray arch has broken away from its rigid, operating position due to contact with a vehicle. The impact reset mechanism includes a bias member that exerts a bias force on a pair of mounting blocks used to support the spray arch. When the spray arch contacts the vehicle, the spray arch pivots one of the mounting blocks. The pivoting movement of the mounting block is sensed and relayed to a control unit. The control unit immediately stops the wash process and moves the spray arch away from the vehicle. The control unit automatically resets the wash process and begins washing the next vehicle without resuming manual intervention.

13 Claims, 5 Drawing Sheets

AUTOMATIC SPRAY ARCH IMPACT RESET MECHANISM

CROSS-REFERENCE TO RELATED APPLICATION

The present application is based on and claims priority to U.S. Provisional Application Ser. No. 60/203,238 filed on May 8, 2000.

BACKGROUND OF THE INVENTION

The present invention relates to a spray arch impact reset mechanism that allows the spray arch of a vehicle wash system to breakaway upon impact with a vehicle. More specifically, the present invention relates to an impact reset mechanism and control unit that automatically resets the spray arch to a home position and allows the vehicle wash system to resume operation after the spray arch has broken away due to contact with the vehicle.

In a vehicle wash system, a vehicle is located at a stationary position within the wash bay and an overhead gantry, including a movable spray arch, travels around the perimeter of the vehicle while performing a vehicle wash sequence typically including the steps of applying soap and subsequently rinsing the vehicle with a high pressure supply of water. During the wash sequence, the spray arch travels along each side of the vehicle, as well as passing along the front and back bumpers. Thus, the movement of the spray arch must be accurately controlled such that the spray arch does not contact the vehicle during the wash process. If the control unit for the vehicle wash malfunctions, it is important that the spray arch include a breakaway mechanism to prevent damage to both the spray arch and the vehicle.

In addition to a malfunction in the control system of the vehicle wash, it is also possible that the customer will inadvertently move the vehicle or open a door during the wash sequence. This unexpected motion of the vehicle can cause the spray arch to contact the vehicle during the wash process. Again, a breakaway mechanism is desirable to prevent damage to both the vehicle and the spray arch.

In the past, an automatic spray arch for use in a vehicle wash system was mounted by a series of sheer pins that held the spray arch in its operating position. If the spray arch contacted a vehicle or other stationary object in the wash bay, the movement of the spray arch would fracture one of the sheer pins to prevent damage to both the spray arch and the vehicle.

Although the prior sheer pin system functioned well to prevent damage to both the vehicle and the spray arch, a service personnel was required to reset the spray arch and install new sheer pins each time the spray arch was contacted. In many cases, the vehicle wash system would be out of commission for hours, or in extreme cases, days before a service technician could reinstall the sheer pins. Extended periods of downtime due to the breakaway of the spray arch is undesirable and often times very costly to the vehicle wash owner.

Therefore, it is an object that the present invention to provide an impact reset mechanism that allows the spray arch to break away from a rigid, operating condition upon contacting a fixed object while being automatically resetable, without human intervention, to its rigid, operating condition after such release. Further, it is an object of the present invention to provide a release mechanism that allows the spray arch to return to a home position away from the vehicle prior to the return to the rigid, operating position. It is an additional object of the invention to provide a control unit that resumes normal operation of the vehicle wash system after the spray arch has been reset and moved to a safe, home position. Further, it is an object of the present invention to provide an impact reset mechanism that allows the spray arch to break away along at least two independent axes of rotation such that the spray arch can be released from its rigid operating position upon contact with an object in multiple directions of movement.

SUMMARY OF THE INVENTION

The present invention is an impact reset mechanism and control unit that automatically resets a spray arch in a vehicle washing system after the spray arch has broken away due to contact with a vehicle or other stationary object. The impact reset mechanism includes a bias member, such as a pressurized air cylinder, that exerts a bias force to hold the spray arch in a rigid, operating position during normal operating conditions for the vehicle wash system.

Upon contact between the spray arch and a vehicle, the spray arch rotates about one or more pivot axes, which forces a stabilizing plate upward against the bias force of the air cylinder. In accordance with the invention, the spray arch is able to "break away" along a pair of axes independently, or, along a compound axis including both of the rotational axes. The upward movement of the stabilizing plate is transferred to a piston of the air cylinder, which causes the piston to retract within the air cylinder. The retraction of the piston within the air cylinder is detected by a sensor, which in turn generates an alarm signal to a computer control unit.

Upon detection of the alarm signal from the sensor within the air cylinder, the control unit releases the air pressure in the air cylinder to remove the bias force. The control unit subsequently retracts the spray arch away from the vehicle to a safe location out of contact with the vehicle. In a first embodiment of the invention, once the spray arch has been returned to a safe, home position, the air cylinder can be repressurized to return the spray arch to its rigid, operating condition.

Alternatively, the air cylinder can remain pressurized after contact with a vehicle and the spray arch moved immediately away form the vehicle upon contact. In both cases, the vehicle wash system can resume washing vehicles once the computer controller determines that the vehicle contacted by the spray arch has been removed from the wash bay and no further danger is present.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
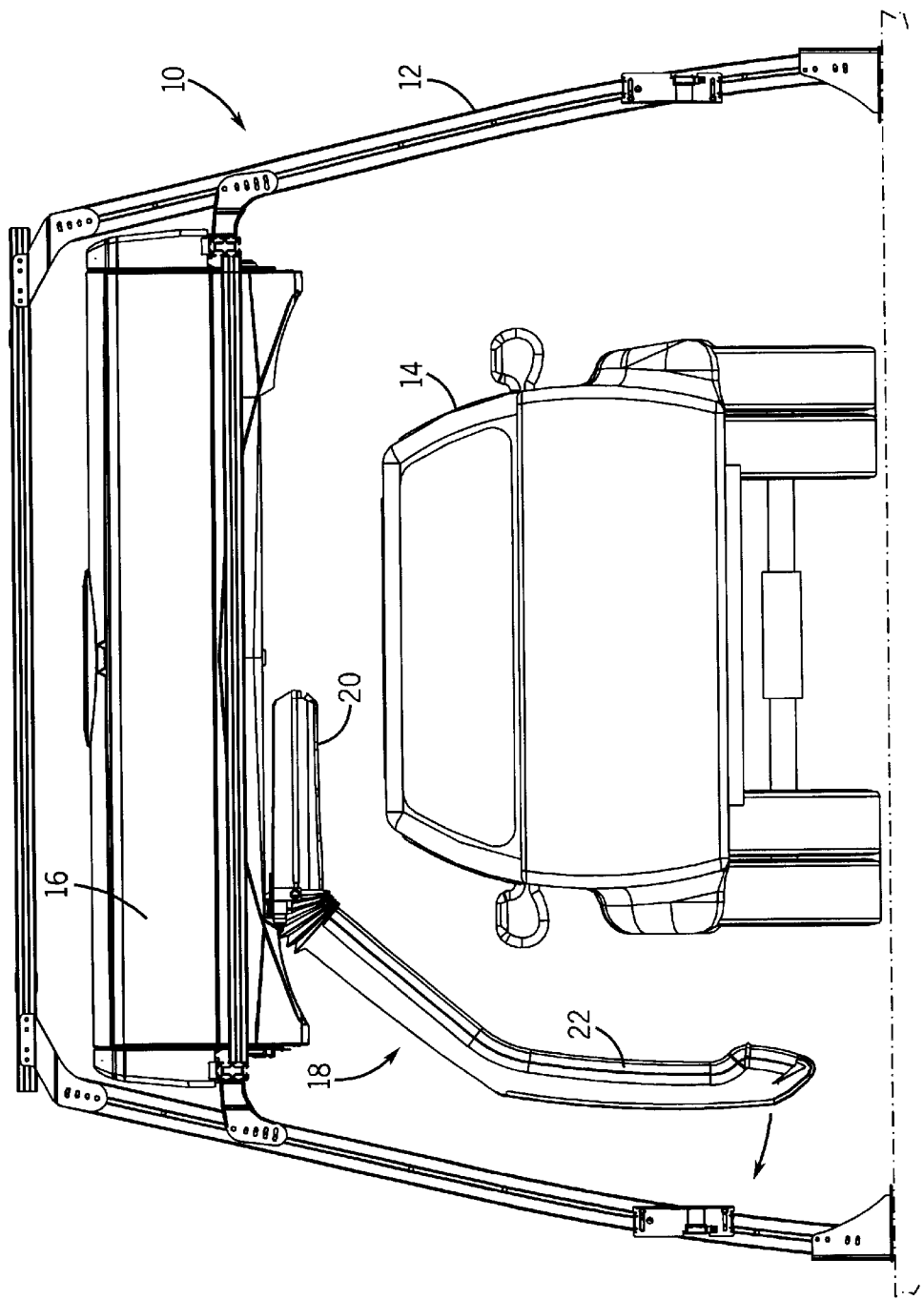
FIG. 1 is an end view illustrating a vehicle positioned within a vehicle wash system having a spray arch mounted to an overhead gantry and including the impact reset mechanism of the present invention.

Referring first to FIG. 1, thereshown is a vehicle wash system 10 incorporating the impact reset mechanism of the present invention. The vehicle wash system 10 generally includes a support frame 12 positioned within a wash bay for receiving the vehicle 14 to be cleaned. The support frame 12 includes a pair of longitudinal support rails onto which an overhead gantry 16 is mounter. The overhead gantry 16 is movable along the support rails such that the overhead gantry 16 can travel along the entire length of the vehicle 14.

The overhead gantry 16 includes a spray arch 18 having a top arm 20 and a side arm 22. During the washing process, the spray arch 18 moves along with the overhead gantry 16 to wash the sides of the vehicle 14. Additionally, the spray arch 18 is rotatable about a vertical axis and is mounted to an overhead drive assembly that is able to move the spray arch 18 from one side of the overhead gantry 16 to the opposite side. In this manner, the spray arch 18 can be used to wash the entire surface of the vehicle while the vehicle remains stationary within the wash bay.

Figure 2:
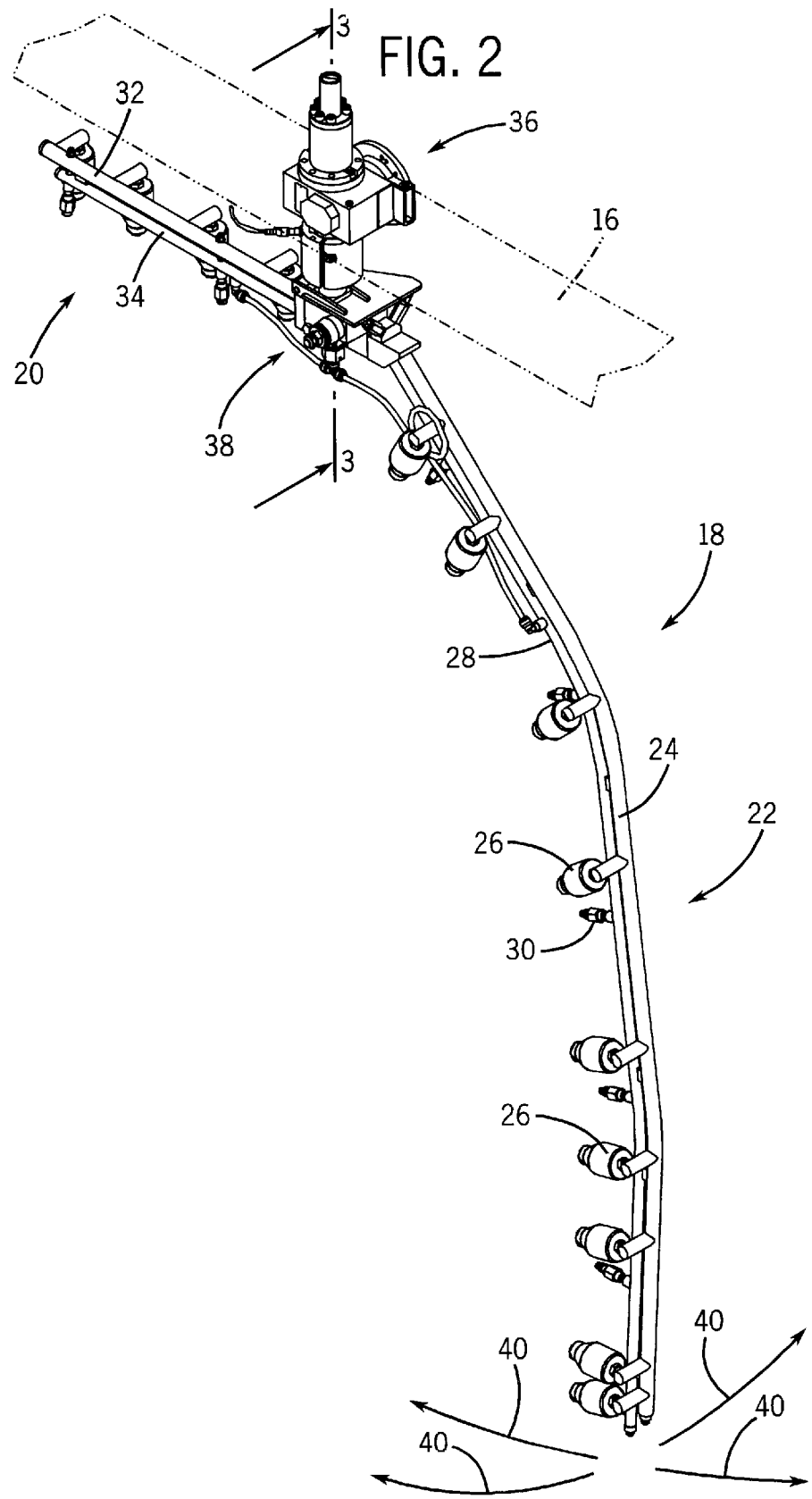
FIG. 2 is perspective view illustrating the impact reset mechanism of the present invention and the spray arch used during the vehicle wash sequence.

Referring now to FIG. 2, thereshown is the spray arch 18 with its protective cover removed to illustrate the various distribution manifolds that form the spray arch. As can be seen in FIG. 2, the side arm 22 includes a high pressure distribution manifold 24 having a series of individual nozzles 26. The nozzles 26 are used to distribute a high pressure supply of water onto the vehicle as the spray arch performs the wash process.

In addition to the high pressure distribution manifold 24, the side arm 22 includes a low pressure product manifold 28 that includes a series of low pressure nozzles 30. The low pressure nozzles 30 contained on the low pressure product manifold 28 are typically used to distribute a cleaning agent or foam onto the vehicle at a low pressure as part of the operation of the vehicle wash system.

The top arm 20 also includes a high pressure distribution manifold 32 and a low pressure product manifold 34. The top arm 20 is typically used to apply a cleaning agent and rinse water to the top of the vehicle, while the side arm 22 applies the cleaning agent and rinse water to the sides of the vehicle.

As can be seen in FIG. 2, the entire spray arch 18 is mounted to an overhead drive assembly 36 that is mounted to the overhead gantry 16. The overhead drive assembly 36 is used to both rotate the spray arch 18 about a vertical axis and move the spray arch along the length of the overhead gantry from one side of the vehicle to the other during the wash process. Although not shown in FIG. 2, the overhead drive assembly 36 is coupled to a control unit for the entire vehicle wash system 10. The control unit controls the entire wash process and thus controls the rotation of the spray arch 18 and the movement of the overhead drive assembly 36 along the length of the overhead gantry 16.

As can be seen in FIG. 2, the spray arch 18 is mounted to the overhead drive assembly, and thus the overhead gantry 16, by an impact reset mechanism 38. The impact reset mechanism 38 is operable to hold the spray arch 18 in a rigid, operating condition, as shown in FIG. 2, such that the spray arch can be accurately controlled by the control unit of the vehicle wash system. Additionally, the impact reset mechanism 38 allows the spray arch to break away from its rigid, operating condition when the spray arch contacts either a vehicle or another stationary object.

As shown in FIG. 2, the impact reset mechanism allows the spray arch 18 to move relative to the overhead drive assembly in one of the four directions illustrated by the arrows 40 in FIG. 2. Movement of the overhead spray arch 18 in the direction of arrows 40 can be a result of the side arm 22 contacting either side of the vehicle or the front or rear bumper of the vehicle as the spray arch moves around the vehicle in combination with the overhead gantry 16. Alternatively, the spray arch 18 can be forced to move in the direction illustrated by arrow 40 as a result of the vehicle owner opening a door or inadvertently moving the vehicle once the wash cycle has begun. Regardless of how the spray arch 18 contacts either the vehicle or a stationary object, the impact reset mechanism 38 of the present invention allows the spray arch to break away from its rigid, operating condition to prevent damage to either the vehicle or the spray arch itself.

Figure 3:
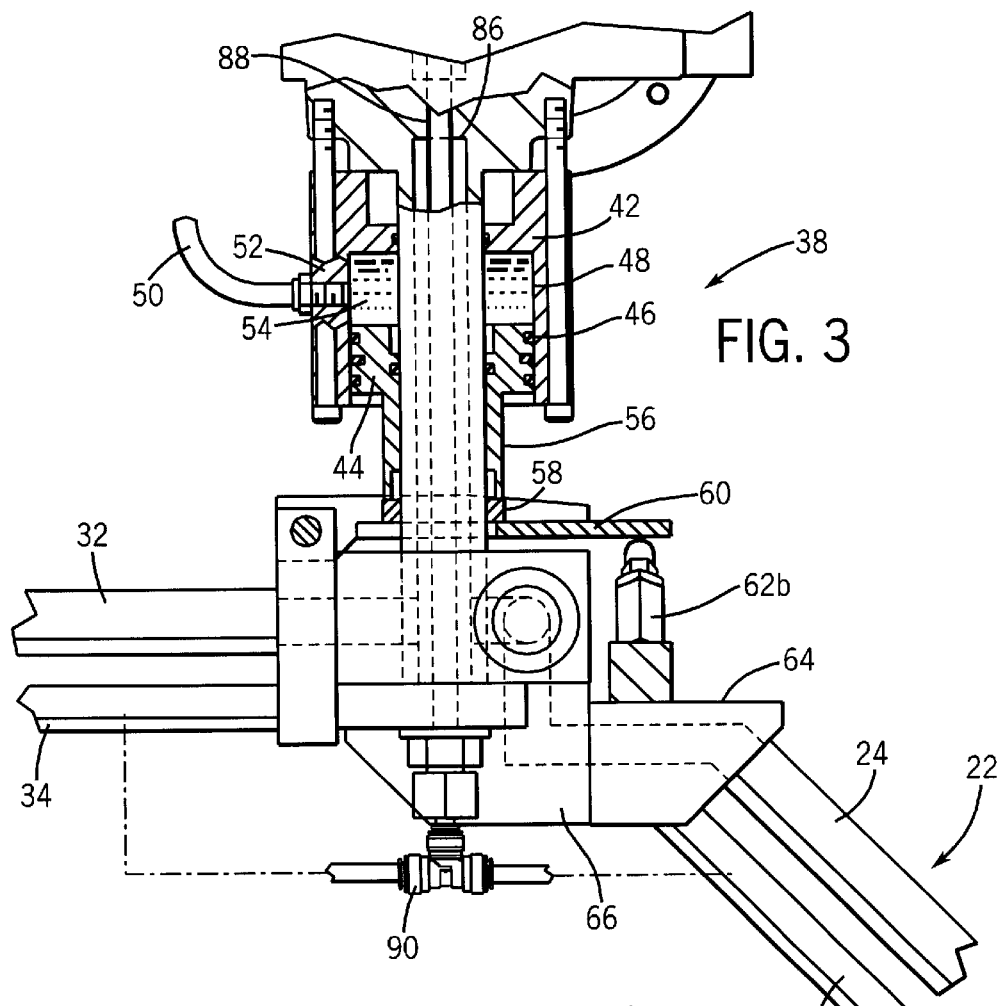
FIG. 3 is a section view taken along line 3—3 of FIG. 2 illustrating the operation of a bias member in holding the spray arch in its rigid, operating condition.

Referring now to FIG. 3, thereshown is the impact reset mechanism 38 of the present invention. The impact reset mechanism 38 includes a bias member, such as an air cylinder 42, that exerts a bias force to hold the spray arch 18 in its rigid, operating condition. The air cylinder 42 of the preferred embodiment includes an internal piston 44 having a series of O-rings 46 that provide a seal against the inner wall 48 of the air cylinder. A supply of pressurized air is fed into the air cylinder by hose 50 which passes through a fitting 52 and into the internal chamber 54. The supply of the pressurized air through the hose 50 is controlled by the control unit of the vehicle wash system.

As can be seen in FIG. 3, the piston 44 includes a depending stem 56 that extends downward into contact with a shoulder 58 formed on a stabilizing plate 60.

Figure 5:
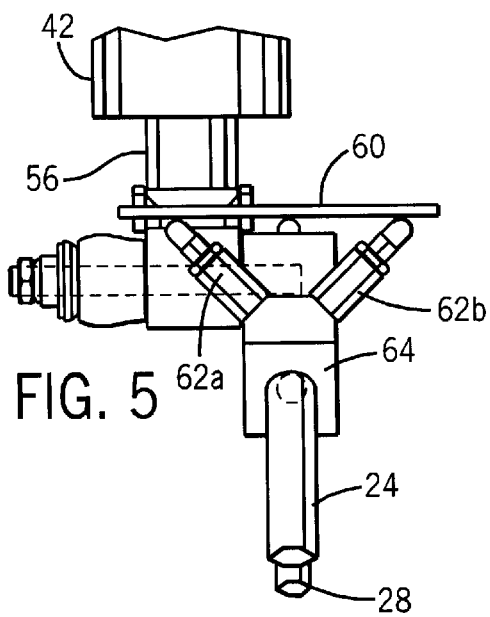
FIG. 5 is a side view illustrating the impact reset mechanism of the present invention.

As can be seen in FIGS. 3 and 5, the stabilizing plate 60 presses down onto a pair of contact legs 62a and 62b contained on a first mounting block 64. The first mounting block 64 provides support for both the high pressure distribution manifold 24 and the low pressure product manifold 28 of the side arm 22 of the spray arch 18. The first mounting block 64 is rotatably mounted about a first rotational axis to a second mounting block 66.

Figure 8:
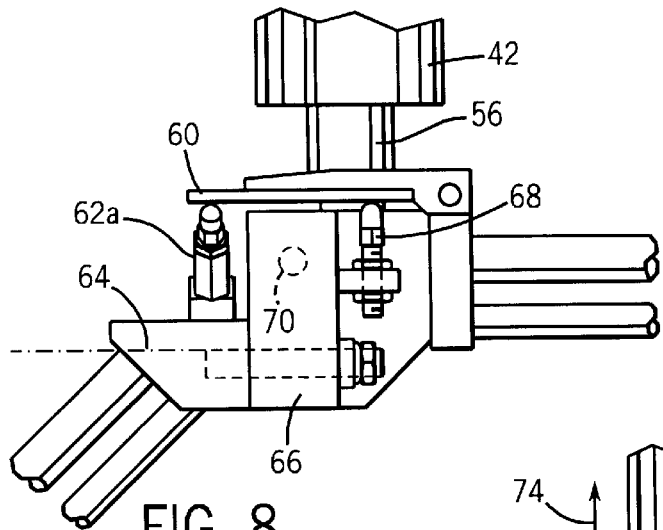
FIG. 8 is a side view illustrating the mounting of the spray arch.

Referring now to FIG. 8, the second mounting block 66 includes its own contact leg 68 that is in contact with the stabilizing plate 60. The interaction between the contact leg 68 and the stabilizing plate 60 restricts the rotation of the second mounting block about a second rotational axis passing through the pivot point 70. Thus, the first mounting block 64 is rotatable about a first rotational axis passing through the second mounting block 66, while the second mounting block 66 is rotatable about a second rotational axis extending through the pivot point 70, as illustrated in FIG.

8. As can be understood in FIG. 8, the first rotational axis of the first mounting block 64 and the second rotational axis of the second mounting block 66 are orthogonal to each other, such that the spray arch can rotate along two separate axes, the significance of which will be described in detail below.

Referring back to FIG. 3, when the air cylinder 42 is pressurized, the air pressure within the internal chamber 54 forces the piston 44 downward such that the stem 56 contacts the shoulder 58 of the stabilizing plate 60. The bias force created by the air cylinder 42 acts on the stabilizing plate 60 such that the stabilizing plate 60 is pressed into contact with the pair of contact legs 62a and 62b on the first mounting block 64 (FIG. 5) and the contact leg 68 on the second mounting block 66, as illustrated in FIG. 8. In this manner, the air cylinder 42 exerts a bias force on the stabilizing plate 60 to restrict the pivoting movement of both the first mounting block 64 and the second mounting block 66 such that the spray arch 18 is held in a rigid, operating condition.

As can be understood in FIGS. 5–10, the spray arch 18 is able to rotate along two distinct rotational axes. Thus, should the side arm 22 of the spray arch contact the vehicle or another stationary object in any direction, the spray arch 18 is able to rotate to prevent damage to either the vehicle or the arm itself.

Figure 4:
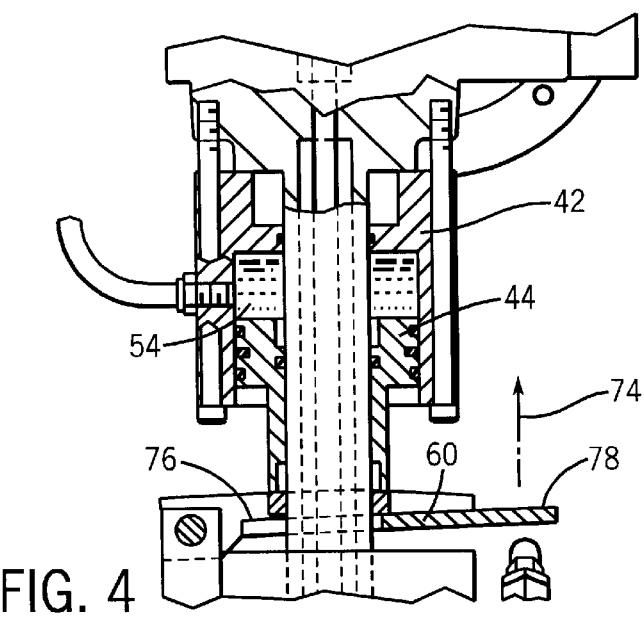
FIG. 4 is a section view similar to FIG. 3 illustrating the upward movement of a stabilizing plate when the spray arch contacts a vehicle or other stationary object.
Figure 6:
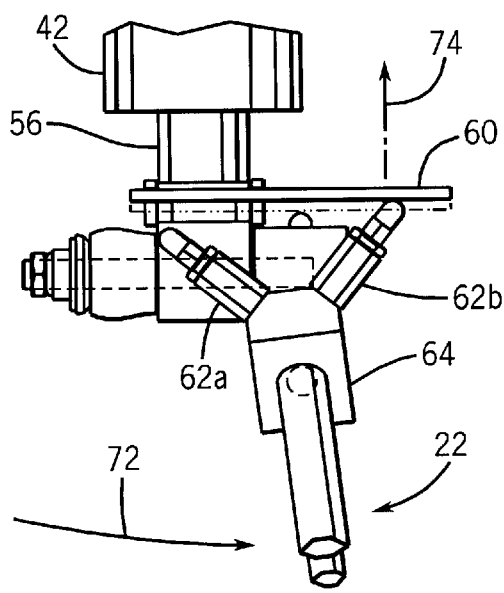
FIG. 6 is a side view similar to FIG. 5 illustrating the rotation of the spray arch and the movement of the stabilizing plate upon the spray arch contacting a vehicle or other object.

Referring now to FIG. 6, when the side arm 22 contacts either the vehicle or a stationary object and is moved in the direction illustrated by arrow 72, the first mounting block 64 rotates such that the contact leg 62b pushes the stabilizing plate 60 upward, as illustrated by arrow 74. As can be seen in FIG. 4, the stabilizing plate 60 is fixed at its first end 76 while its second end 78 is able to move upward, as illustrated by arrow 74. The upward movement of the stabilizing plate 60 pushes the piston 44 of the air cylinder 42 upward within the internal chamber 54.

In the preferred embodiment of the invention, a sensor is positioned to detect the movement of the piston 44 resulting from contact between the spray arch and a stationary object. The sensor detects movement of the piston 44 and generates an alarm signal to the control unit of the vehicle wash system. Upon receiving the alarm signal indicating that the spray arch has contacted a stationary object, the control unit can take the required steps to avoid damage to both the vehicle and the spray arch, as will be discussed below.

Referring back to FIG. 7, if the side arm 22 contacts a stationary object in the opposite direction and moves as indicated by arrow 80, the contact leg 62a contacts the stabilizing plate 60 to push the stabilizing plate 60 upward, as is also illustrated by arrow 74. Again, the upward movement of the stabilizing plate 60 moves the piston 44, which is sensed and relayed to the control unit.

Figure 7:
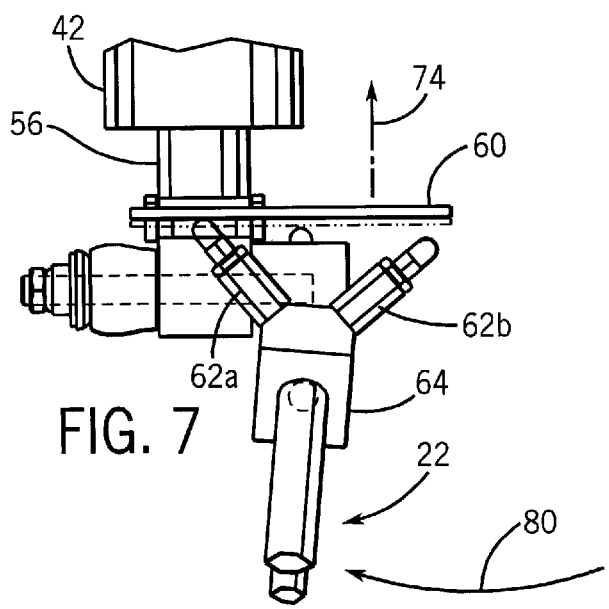
FIG. 7 is a view similar to FIG. 6 illustrating the movement of the spray arch in an opposite direction.
Figure 9:
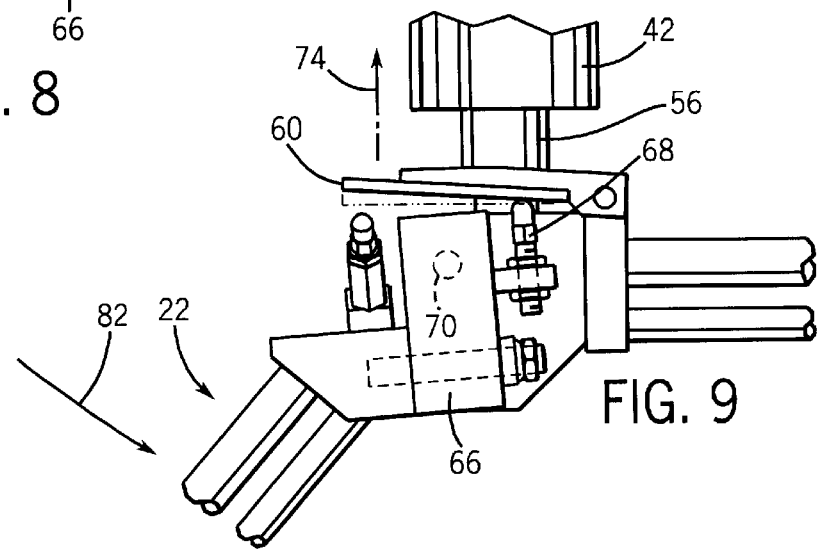
FIG. 9 is an illustration of the movement of the spray arch and the stabilizing plate upon the spray arch contacting a fixed object.

In addition to breaking away in the directions illustrated by arrows 72 and 80 in FIGS. 6 and 7, the side arm 22 can also break away in the direction illustrated by arrow 82 in FIG. 9. When the side arm 22 is moved in the direction illustrated by arrow 82, the second mounting block 66 rotates about pivot point 70 such that the contact leg 68 pushes the stabilizing plate 60 upward, as illustrated by arrow 74. Once again, as indicated in FIG. 4, the upward movement of the stabilizing plate 60 causes the piston 44 to move upward against the bias force created by the pressurized air within the internal chamber 54. A sensor detects this upward movement of the piston 44 and relays an alarm signal to the control unit for the vehicle wash system.

Figure 10:
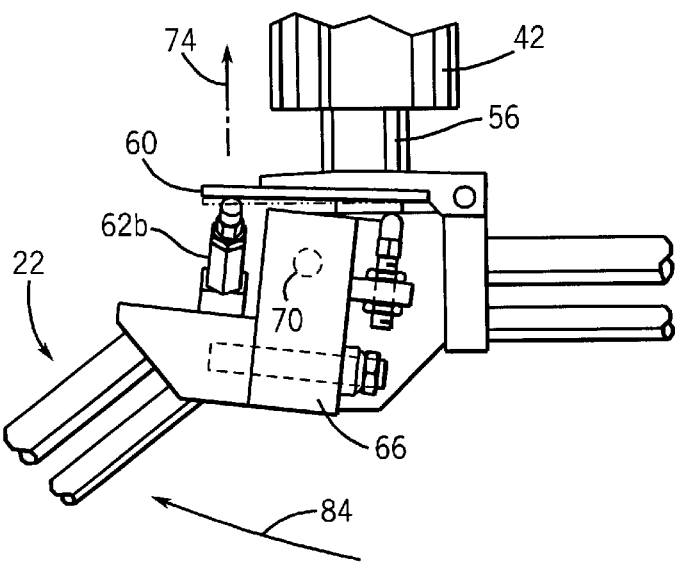
FIG. 10 is a view similar to FIG. 9 illustrating the movement of the spray arch in a direction opposite to that shown in FIG. 9.

Referring now to FIG. 10, when the side arm 22 is moved in the direction illustrated by arrow 84, the second mounting block 66 pivots about the pivot point 70, which causes the pair of contact legs 62a and 62b to push the stabilizing plate 60 upward, as illustrated by arrow 74 in FIG. 10. Again, the upward movement of the stabilizing plate 60 forces the piston 44 upward, as illustrated in FIG. 4. This upward movement of the piston 44 is sensed and an alarm signal is relayed to the control unit for the vehicle wash system.

Although the spray arch 18 has been described as breaking away in only one of the four directions at a time, it should be understood that the first mounting block 64 and the second mounting block 66 are independently rotatable and allow the spray arch to move in a compound direction that is a combination of the first rotational axis and the second rotational axis. Movement in a compound direction results in the contact legs 62a and 62b, as well as the contact leg 68, pushing the stabilizing plate 60 upward to trigger the internal sensor within the air cylinder 42.

Upon receiving an alarm signal from the sensor within the air cylinder 42 of the impact reset mechanism 38, the computer control unit for the vehicle wash system initially moves either the overhead gantry or the spray arch away from the vehicle within the vehicle wash bay. For example, if the spray arch is washing either the front or the back of the vehicle, the control unit activates the drive mechanism for the overhead gantry to move the entire gantry and the spray arch away from the vehicle. Alternatively, if the spray arch is located along either side of the vehicle, the control unit operates the overhead drive assembly to move the spray arch along the overhead gantry away from the vehicle.

Once the spray arch has been moved away from the vehicle, the computer control unit moves the overhead gantry 16 and the drive assembly 36 to a home position typically located at the entry to the wash bay. The home position is located away from the vehicle such that no further contact occurs between the spray arch 18 and the vehicle. Once the computer control unit has moved the overhead gantry and the drive assembly to the home position, air pressure is reapplied to the air cylinder 42 to force the piston 44 downward into contact with the stabilizing plate 60. When the bias force is applied by the piston 44 to the stabilizing plate 60, the stabilizing plate 60 again is held in its rigid, operating condition and the vehicle wash system can be brought back on-line. In the preferred embodiment of the invention, the control unit utilizes a series of sensors in the wash bay to confirm that the wash bay is safe and clear prior to resuming normal wash functions. As can be understood by the previous description, the vehicle wash system utilizing the impact reset mechanism of the present invention can be reset automatically by the computer control unit without the need for service personnel to come out to the vehicle wash system and reinstall shear pins, as was the case in the prior art systems.

Referring back to FIG. 3, both the piston 44 and the stem 56 are hollow structures that allow both the high pressure water line 86 and the low pressure cleaning solution line 88 to pass through the air cylinder. The low pressure line 88 is received by a T-connector 90 and distributed to both of the low pressure product manifolds 28 and 34. Likewise, the high pressure supply 86 is distributed to both of the high pressure distribution manifolds 24 and 32.

Operation

Referring first to FIG. 3, the operation of the impact reset mechanism 38 will now be described. Initially, the air cylinder 42 is pressurized by a supply of air from the hose 50 entering into the internal chamber 54. The internal pressure within the chamber 54 forces the piston 44 downward such that the stem 56 contacts the stabilizing plate 60. The stabilizing plate 60 is forced into contact with the pair of contact legs 62a and 62b contained on the first mounting block 64 and the single contact leg 68 supported on the second mounting block 66. The air pressure within the cylinder 42 holds the spray arch in a rigid, operating position such that the spray arch can be moved around the vehicle by the combination of the overhead gantry and drive assembly 36.

During operation, if a mechanical failure, sensor value error or customer fault results in the side arm 22 of the spray arch coming into contact with the customer's vehicle, either the first mounting block 64 will rotate about the first rotational axis or the second mounting block 66 will rotate about the second rotational axis. For example, if the side arm 22 is pushed outward away from the vehicle, as illustrated by the arrow in FIG. 1, the second mounting block 66 will rotated, as illustrated in FIG. 10. The pair of contact legs 62a and 62b will then press the stabilizing plate 60 upward and cause the piston 44 to retract into the air cylinder 42, as illustrated in FIG. 4. The sensor within the air cylinder will generate an alarm signal to the computer control unit.

Upon receiving the alarm signal, the control unit will immediately terminate the movement of the overhead gantry and the spray arch. By terminating the movement, the control unit prevents further movement in a direction that resulted in contact with the vehicle.

In a first embodiment of the invention, the computer control unit will release all of the pressure within the internal chamber 54 such that the spray arch 18 will go limp to prevent damage to the vehicle. After the pressure has been removed from within the air cylinder 42, the computer control unit will move the spray arch in the direction opposite the direction of movement that resulted in the contact with the vehicle. Next, the control unit will retract the spray arch 18 away from the vehicle by moving the overhead drive assembly 36 and the overhead gantry. Once the spray arch has been retracted away from the vehicle, the overhead gantry and drive mechanism 36 will move the spray arch to a "safe corner" away from the vehicle. Once in the safe position, the computer control unit will again repressurize the air cylinder 42, causing the stabilizing plate 60 to hold the first and second mounting blocks 64, 66 in their rigid, operating position.

Once the computer controller confirms the wash bay is safe and clear, the vehicle washing system can begin a new wash cycle once another vehicle enters into the wash bay.

Although the embodiment above calls for the control unit to remove pressure from the cylinders 42 upon detecting contact between the spray arch and the vehicle, it is also contemplated by the inventors that the air pressure could remain within the cylinder while the overhead gantry and overhead drive assembly move the spray arch 18 away from the vehicle. This embodiment may be more desirable since it prevents the spray arch from going limp and possibly contacting the vehicle.

Although the present embodiment of the invention has been described as utilizing an air cylinder as the bias member to exert a bias force on the stabilizing plate, it is contemplated by the inventors that other types of bias members could be used while operating within the scope of the invention. For example, a hydraulic cylinder or a spring element could be used to exert the bias force on the stabilizing plate. In either case, a sensor is positioned to detect movement of the stabilizing plate as a result of rotation of either the first mounting block 64 or the second mounting block 66 due to contact between the spray arch and a stationary object.

Various alternatives and embodiments are contemplated as being within the scope of the following claims particularly pointing out and distinctly claiming the subject matter regarded as the invention.

We claim:

1. A vehicle wash system including an overhead gantry for moving a spray arch around a stationary vehicle positioned in a wash bay, the vehicle wash system comprising:
    an impact reset mechanism operable to exert a bias force to hold the spray arch in a rigid, operating condition, the impact reset mechanism allowing rotation of the spray arch against the bias force upon contact between the spray arch and the vehicle during movement of the spray arch around the vehicle;
    a sensor positioned to monitor the rotation of the spray arch against the bias force upon the spray arch contacting the vehicle; and
    a control unit coupled to the sensor to receive a signal from the sensor upon rotation of the spray arch against the bias force, wherein the control unit stops the movement of the spray arch upon receiving the signal from the sensor;
    wherein the control unit is operable to move the spray arch away from the vehicle and automatically resetting the wash process after contact between the spray arch and the vehicle.

2. The impact reset mechanism of claim 1 wherein the impact reset mechanism includes a bias member operable to exert a bias force on the spray arch.

3. The vehicle wash system of claim 2 wherein the bias member resists rotation of the spray arch along a first rotational axis and a second rotational axis.

4. The vehicle wash system of claim 2 wherein the impact reset mechanism comprises:
    a first mounting block attached to the spray arch, the first mounting block being rotatable about a first rotational axis;
    a second mounting block coupled to the first mounting block, the second mounting block being rotatable about a second rotational axis, the second rotational axis being different than the first rotational axis, wherein the spray arch is rotatable about both the first rotational axis and the second rotational axis upon contacting the vehicle; and
    a bias member positioned to exert the bias force on the first mounting block and the second mounting block to hold the spray arch in a rigid, operation condition, wherein the bias force restricts the rotation of each of the mounting blocks about the first and second axes.

5. The vehicle wash system of claim 4 further comprising a stabilizing plate extending over and positioned in contact with both the first mounting block and the second mounting block, wherein the bias member acts on the stabilizing plate to restrict the rotation of the first mounting block and the second mounting block to hold the spray arch in the rigid operating condition.

6. The vehicle wash system of claim 5 wherein the stabilizing plate is cantilevered about a first end, wherein rotation of the first mounting block or the second mounting block causes a second end of the stabilizing plate to move upward.

7. The vehicle wash system of claim 5 wherein the bias member includes a movable piston positioned in contact with the stabilizing plate.

8. The vehicle wash system of claim 7 wherein the bias member is an air cylinder.

9. The vehicle wash system of claim 7 wherein the sensor is positioned to detect movement of the piston as a result of rotation of the first mounting block or the second mounting block.

10. The vehicle wash system of claim 5 wherein the stabilizing plate is pivotable about one end such that rotation of the first mounting block or rotation of the second mounting block pivots the support plate upward against the bias force.

11. The vehicle wash system of claim 4 wherein the first mounting block is rotatably mounted to the second mounting block such that the first rotational axis passes through the second mounting block.

12. The vehicle wash system of claim 4 wherein the control unit removes the bias force and moves the spray arch away from the vehicle upon detection of rotation of the first mounting block or the rotation of the second mounting block.

13. The vehicle wash system of claim 12 wherein the control unit automatically reactivates the bias member to exert the bias force after the spray arch has moved away from the vehicle.

* * * * *